United States Patent
Al-Johany

(10) Patent No.: US 10,442,601 B1
(45) Date of Patent: Oct. 15, 2019

(54) MOBILE DEVICE SYSTEM FOR DISPENSING ORAL CONSUMABLES

(71) Applicant: KING SAUD UNIVERSITY, Riyadh (SA)

(72) Inventor: Sulieman Saleem B. Al-Johany, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/192,025

(22) Filed: Nov. 15, 2018

(51) Int. Cl.
| | |
|---|---|
| B65D 83/00 | (2006.01) |
| H04M 1/21 | (2006.01) |
| B65D 83/04 | (2006.01) |
| B65D 83/08 | (2006.01) |
| A61J 7/00 | (2006.01) |

(52) U.S. Cl.
CPC ..... *B65D 83/0038* (2013.01); *B65D 83/0409* (2013.01); *B65D 83/0817* (2013.01); *H04M 1/21* (2013.01); *A61J 7/00* (2013.01)

(58) Field of Classification Search
USPC ................................................. 700/231–244
See application file for complete search history.

(56) References Cited

U.S. PATENT DOCUMENTS

| | | | | |
|---|---|---|---|---|
| 6,390,328 | B1 * | 5/2002 | Obermeier | G07F 11/24 221/203 |
| 9,138,539 | B1 | 9/2015 | Friedman | |
| 9,510,999 | B2 | 12/2016 | Joyce et al. | |
| 2011/0295416 | A1 * | 12/2011 | Aquilonius | A61J 7/0076 700/232 |
| 2012/0160716 | A1 * | 6/2012 | Chan | A61J 7/0481 206/216 |
| 2015/0359711 | A1 * | 12/2015 | Ducatt | A61J 7/0076 221/13 |
| 2016/0107820 | A1 | 4/2016 | Macvittie et al. | |
| 2016/0287480 | A1 | 10/2016 | Hancock et al. | |
| 2018/0289590 | A1 * | 10/2018 | Graska | A61J 7/0076 |

FOREIGN PATENT DOCUMENTS

CN    103957293 A1    7/2014

OTHER PUBLICATIONS

"A Smart Mobile Medication Dispenser," Intent Solutions website, 2017.

* cited by examiner

*Primary Examiner* — Timothy R Waggoner
(74) *Attorney, Agent, or Firm* — Richard C. Litman

(57) ABSTRACT

A system for dispensing oral consumables includes a mobile device and an oral consumables dispenser attached to the device. The dispenser can include a retractable holder for storing the oral consumables. As mobile electronic devices and their associated accessories are carried by most people for lengthy periods throughout the day, the system for dispensing oral consumables can facilitate timely consumption of oral consumables.

9 Claims, 5 Drawing Sheets

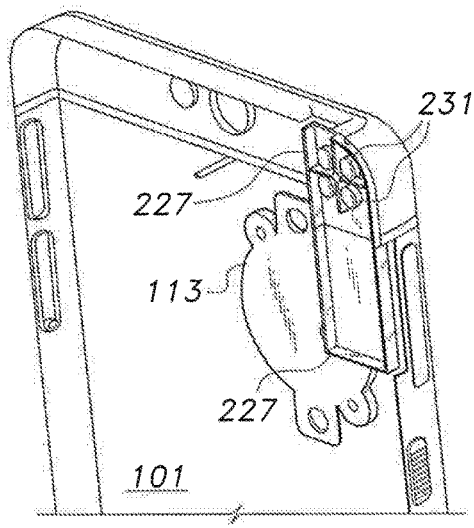
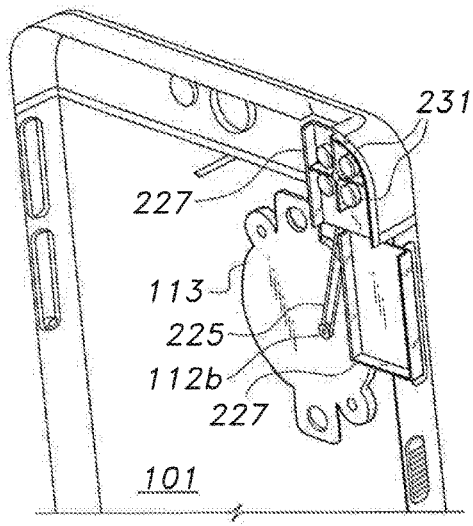
FIG. 4A  FIG. 4B
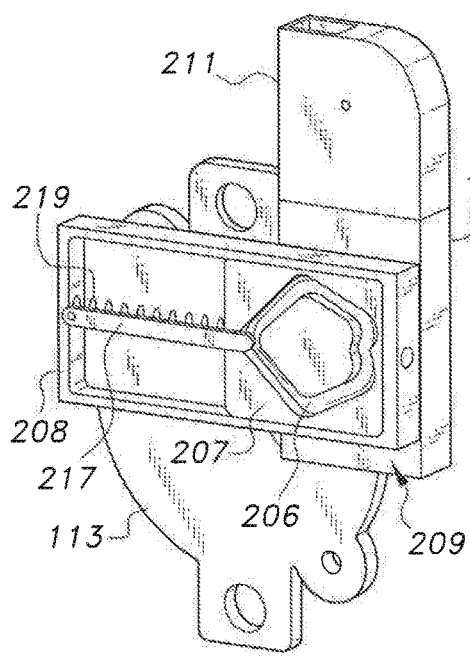
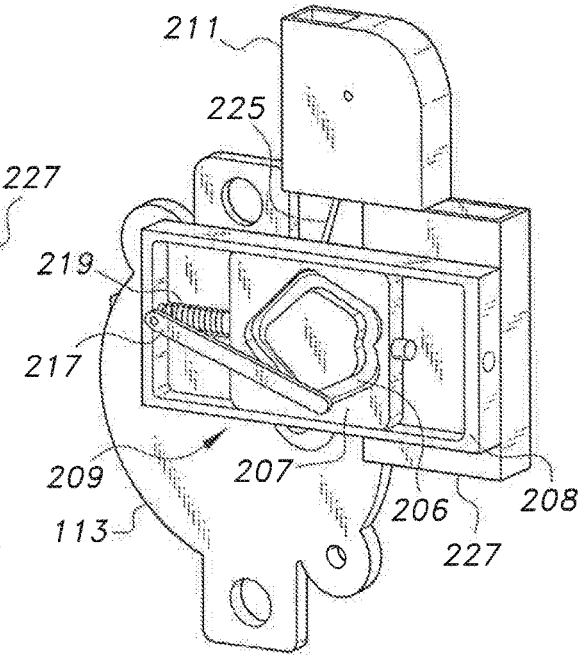
FIG. 5A  FIG. 5B

MOBILE DEVICE SYSTEM FOR DISPENSING ORAL CONSUMABLES

BACKGROUND

1. Field

The present disclosure relates to dispensing oral consumables, such as tablets, thin film consumables, or chewing gum, to a user of a mobile electronic device. In particular, the disclosure relates to a dispenser attached to the structure of a mobile device (e.g. mobile phone or mobile phone case).

2. Description of the Related Art

Oral consumables in the form of pills, tablets, thin films, or sheets, are typically carried with a user throughout the day. These oral consumables include medicine or breath fresheners, such as mints or chewing gum. The oral consumables may be required by a user multiple times during the day or as needed. Aura-indicated anti-migraine medications, for example, need to be taken quickly after the onset of symptoms. As such, it is important that these types of oral consumables are easily accessible throughout the day.

Thin films are dissolvable films that can be placed on a user's tongue to deliver a variety of products into the oral cavity of the user. The thin film products can include, for example, medication, breath fresheners, and/or sweet flavoring. In the case of thin film medications, the drug is absorbed transmucosally-sublingually, buccally or enterally, whereas in the case of oral treatments, such as breath mints and sweets, oral exposure is typically desired, but transmucosal absorption may or may not be intended. Medications taken in a manner which facilitates transmucosal absorption in the oral cavity (typically, sublingually or buccally) provide improved bioavailability. Thin film medications are of particular interest in the delivery of medications where enhanced or fast absorption is desired. The ease of use by the patient, as well as improved bioavailability of medication incorporated in the film has made this type of drug delivery widely used and accepted by patients.

The dispensing of thin film medications can be challenging, however. The medicated strips are usually provided in small plastic containers or dispensers that are are easily lost, either in the user's pocket or purse, or misplaced. Additionally, many conventional dispensers are single use containers. As such, once the initial supply of oral thin film consumables is used, a new container must be purchased. usually purchased and discarded once the content is consumed. The containers with openable or detachable tops.

because the physical configuration of thin film medications is in the form of thin sheets. Conventional dispensers for these sheets are also small and thin. For sanitary purposes, it is also desirable to load and dispense oral thin film consumables in a manner that minimizes direct contact with the consumables prior to consuming the consumables.

SUMMARY

A system for dispensing oral consumables includes a mobile device and an oral consumables dispenser attached to the device. The dispenser can include a retractable holder for storing the oral consumables. As mobile electronic devices and their associated accessories are carried by most people for lengthy periods throughout the day, the system for dispensing oral consumables facilitates timely consumption of oral consumables.

These and other features of the present invention will become readily apparent upon further review of the following specification.

BRIEF DESCRIPTION OF THE DRAWINGS

FIG. 2B shows the mill without the mill cover depicted in FIG. 2A.

FIG. 3B shows the exposed, open end of the reloader when the reloader is moved away from the dispenser.

FIGS. 4A and 4B show the motorized mill positioned within the mobile device.

FIGS. 5A and 5B show the reloader attached to the frame of the toggle guide assembly.

Similar reference characters denote corresponding features consistently throughout the attached drawings.

DETAILED DESCRIPTION OF THE PREFERRED EMBODIMENTS

Figure 1:
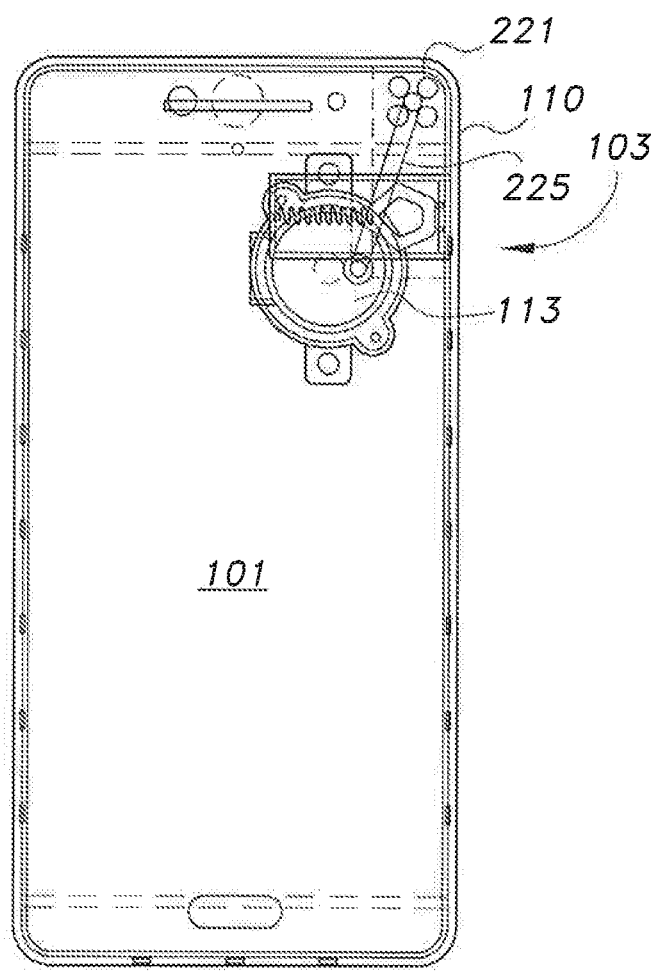
FIG. 1 is a rear view of an embodiment of an oral consumables dispenser installed in a mobile phone.

FIG. 1 is a rear view of a system for dispensing oral consumables 103. The system 103 includes a mobile device and an oral consumables dispenser 113 attached to the device. The mobile device can include a mobile electronic device or a mobile electronic device accessory. Thus, although the system shown in the figures includes a mobile phone 101, it should be understood that the system can include a mobile phone accessory, such as a removable mobile phone case, instead. Further, the dispenser 113 can be positioned within the device (as shown in the figures) or on an exterior surface of the device. As mobile electronic devices (mobile phones, for example) and their associated accessories are carried by most people for lengthy periods throughout the day, the system for dispensing oral consumables 103 can facilitate timely consumption of oral consumables when needed. The system is particularly advantageous because the associated mobile electronic device can be programmed to set off an alarm to remind a user to take a medication or other consumable stored within the system and/or record the time the consumable was taken. The system also eliminates the need for carrying drug containers separate from mobile electronic devices (e.g. mobile phones) and the need to obtain new dispensers for oral consumables after use.

Figure 2A:
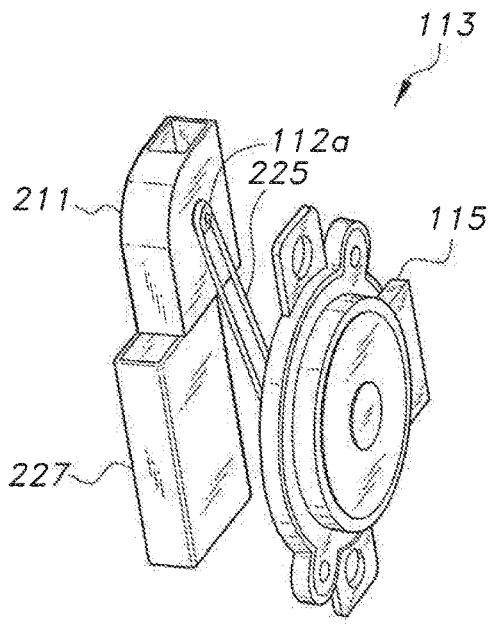
FIGS. 2A and 2B show the motorized mill and reloader of the dispenser of FIG. 1.
Figure 2B:
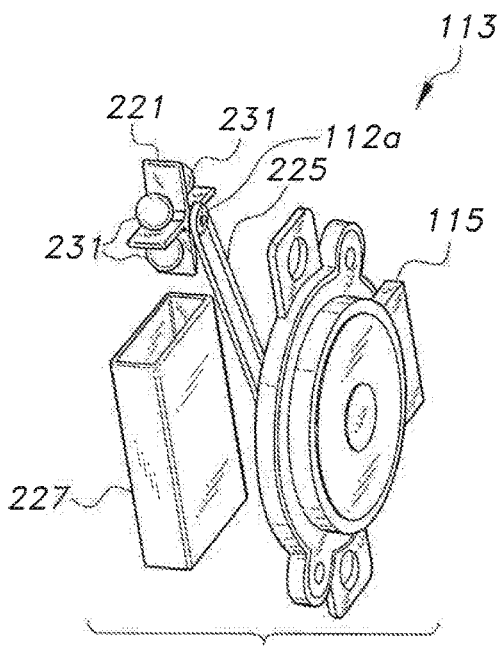

As shown in FIGS. 2A and 2B, the dispenser 113 includes a mill 221, a reloader 227, and a motor 115. A drive belt 225 extends between a first pulley 112*a* (FIG. 2B) attached to the mill 221 and a second pulley 112*b* (FIG. 4B) attached to the motor 115. The mill 221 includes multiple arms 231 with slots defined therebetween. Each slot is configured for storing a single oral consumable, such as a pill (FIGS. 4A-4B). A mill cover 211 is provided for covering the mill 221. The mill cover 211 includes an open base and a slot 210 opposing the base. The reloader 227 has an open end adjacent the mill cover 211, an opposing closed end, and a hollow cavity therebetween for receiving and storing the oral consumables. The reloader 227 is configured to move away from the mill cover 211 and toward a user when pressure is exerted thereon. Thus, the open end of the reloader 227 can be exposed to the user by pressing the reloader 227.

Figure 3A:
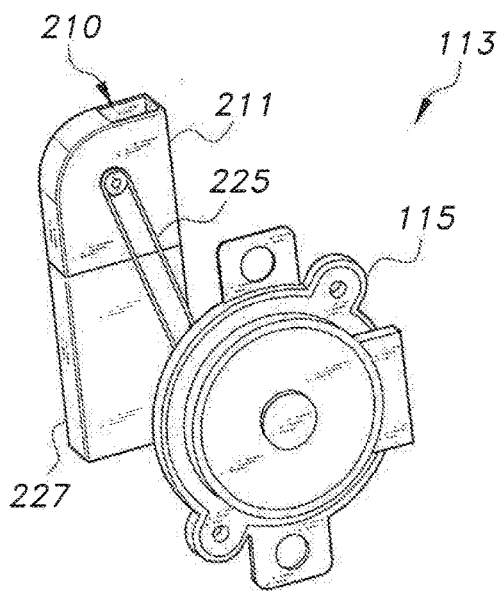
FIGS. 3A and 3B show the motorized mill and reloader of the dispenser of FIG. 1.
Figure 3B:
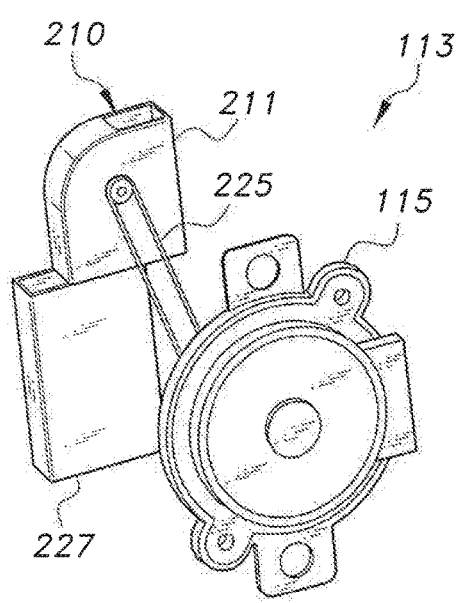

In an embodiment, the reloader 227 can be connected to a resilient device, such as a spring or spring-loaded device, to facilitate retractable movement of the reloader 227. For example, as shown in FIGS. 5A and 5B, a toggle guide assembly 209 can be provided for facilitating movement of the reloader 227. The toggle assembly 209 includes a base 207 that is fixed to a wall of the motor 215, a slidable frame 208 that is slidably attached to the base 207, a toggle rod 217 pivotally attached to the frame 208 at a first end, and a spring 219 extending between the frame 227 and the base. The reloader 227 is fixedly secured to the frame 208. The base 207 includes a generally circular channel 206 defined therein. A second end of the rod 217 is movably positioned within the channel 206. When the reloader 227 is in the closed position (FIG. 3A) the spring 219 is extended, as shown in FIG. 5A, and the second end of the rod 217 is positioned at a first position of the channel. Upon pressing the reloader, the spring is compressed and the second end of the rod moves through the channel to a, second position in the channel. Extension of the spring and movement of the rod in this manner pushes the frame and attached reloader outward to expose the open end of the reloader to a user (FIG. 3B). Once the open end is exposed, the reloader can be loaded with the oral consumables. The user can then push the reloader back inwards to extend the spring and cause the rod to move back through the channel to its first position.

In use, the user activates the motor 115 and turns the mobile device upside down. The motor turns the first pulley which in turn drives the belt that turns the second pulley. Rotation of the second pulley rotates the arms of the mill and dispenses one pill at a time through the slot in the cover 211. If the dispenser is installed within the mobile device, a corresponding slot or outlet can be provided in the device to allow the pills out of the system. Preferably, the motor is a stepper motor. The motor can be configured for activation by any means known in the art. In an embodiment, the associated mobile electronic device can include an application for activating and/or controlling the stepper motor.

The mobile electronic device can further be integrated into the dispensing function. For example, an alarm clock feature can be integrated with the dispenser to notify the user of scheduled doses of the consumables. The user can be queried as to a desire to dispense a pill at a predetermined time, and the pill can be dispensed according to the user's response. Similarly, in response to dispensing a pill, a signal can be provided to the mobile electronic device, and a record can be made, so that the user is able to confirm a recollection as to whether the pill was dispensed.

In some cases, medications are taken in response to sensed conditions. The mobile electronic device can be configured to receive signals related to the sensed condition and notify the user accordingly. In the case of medication for which there is a delayed physiological response to the taking of the medication, the mobile electronic device can combine sensed data with a record of when the medication was dispensed, thereby avoiding the risk of overdose.

Figure 6:
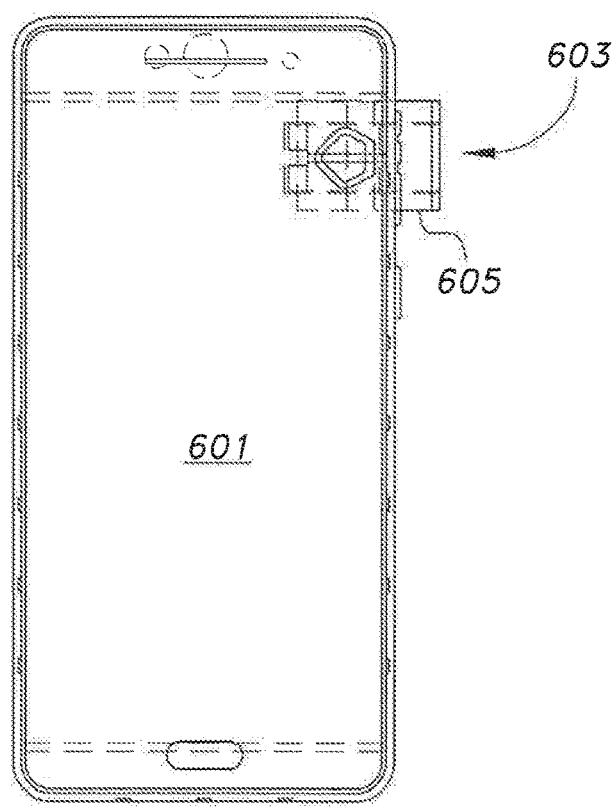
FIG. 6 is a rear view of an alternative embodiment of an oral consumables dispenser installed in a mobile phone.
Figure 7:
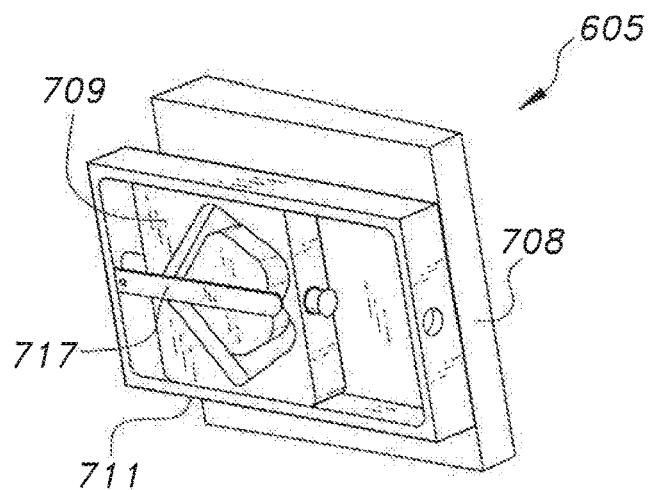
FIG. 7 shows the reloader of FIG. 6 attached to the frame of the toggle guide assembly.

FIG. 6 is a rear view of an alternative embodiment of a system for dispensing oral consumables 603. The system 603 includes a mobile electronic device or mobile device accessory and a retractable dispenser 605. Although a mobile phone 601 is shown in the figures, it should be understood that the system can include a mobile device accessory, such as a removable mobile phone case, instead. System 603 is similar to system 103 except that system 603 does not include a motorized mill. Like system 103, system 603 includes reloader 708 that is retractably positioned within the device 601. As shown in FIG. 7, the reloader 708 can be affixed to a toggle guide assembly 717. The toggle guide assembly 717 is the same as the toggle guide assembly 209 described above and includes a fixed base 709 and a spring-loaded frame 711 that is slidably attached to the base. The reloader 708 is attached to the frame 711. The system 603 is particularly useful for dispensing thin film consumables. The thin films can be loaded into and dispensed from the reloader 708.

Figure 8A:
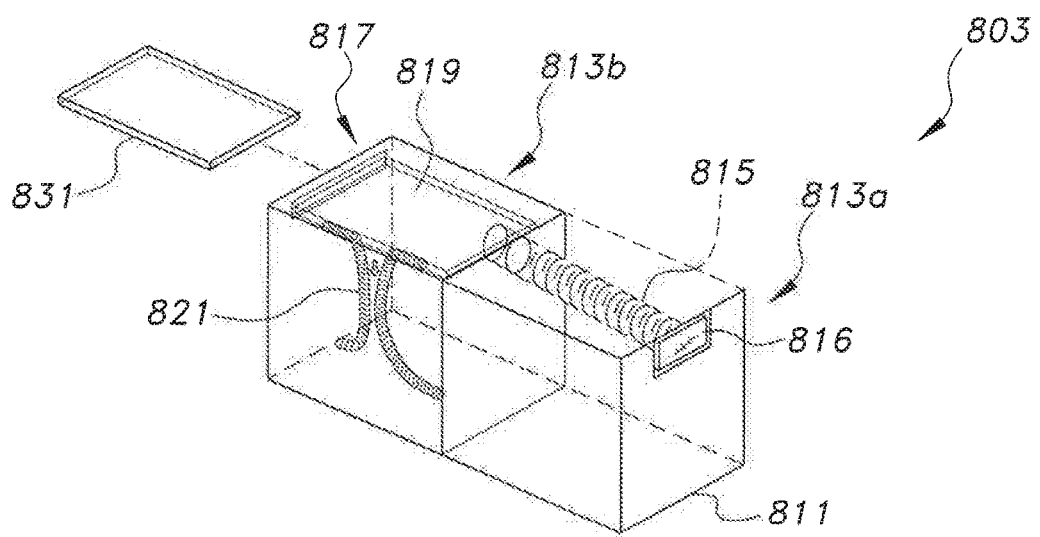
FIGS. 8A and 8B show an alternative embodiment of the oral consumables dispenser.
Figure 8B:
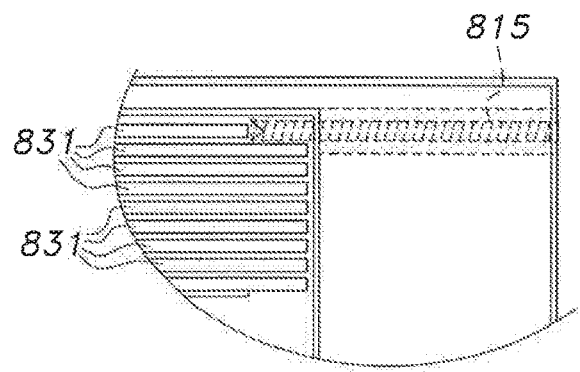

FIGS. 8A and 8B show an alternative embodiment of a retractable dispenser for the system for dispensing oral consumables 603, designated 803. The dispenser 803 is particularly useful for dispensing sheet-like consumables, e.g., chewing gum. Referring to FIG. 8A, dispenser 803 comprises a dispenser housing 811 that includes a first chamber 813*a* and a second chamber 813*b*. A discharger rod 815 extends across the first chamber 813*a*. The discharger rod 815 is connected to an actuator button 816 that is accessible from an exterior of the housing. The second chamber 813*b* includes a spring plate 819, a resilient device 821, and a slot 817 through which consumables 831 can be dispensed from the housing. As shown, the resilient device 821 can be a spring. Consumables 831 in the form of sheets (e.g., chewing gum) can be stacked in the second chamber 813*b* on spring plate 819 and urged upward by the resilient device 821. The discharger rod 815 can be spring-loaded and can selectively contact consumables 831 on the spring plate 819. The actuator button 816 can be manipulated by a user to move the discharger rod 815 forward and, thereby, push consumables 831 out of the second chamber as shown in FIGS. 8A and 8B. Discharger rod 815 then returns to its original position to allow movement of subsequent consumables 831 in chamber 813*b*. If disposed within the mobile device, the dispenser 803 can be configured to extend across the device, such that the actuator button 816 can be accessed from one side of the device and the consumable 831 can be dispensed through an opposing side of the device.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A system for dispensing oral consumables, comprising:
a mobile device;
an oral consumables dispenser attached to the device, the dispenser including a retractable holder for receiving and storing the oral consumables; and
a toggle guide assembly, the toggle guide assembly including:
a fixed base;
a circuit channel defined within the base;
a frame slidably mounted to the base;
a toggle rod pivotally connected to the frame and extending between the channel and the frame; and
a resilient device connected to the frame and the base, wherein the retractable holder is affixed to the slidable frame.

2. The system for dispensing oral consumables as recited in claim 1, wherein the oral consumables dispenser further comprises:
   a mill including a plurality of spaced arms;
   a first pulley connected to the plurality of arms;
   a motor;
   a second pulley connected to the motor; and
   a belt connected to the first pulley and the second pulley.

3. The system for dispensing oral consumables as recited in claim 1, wherein the dispenser includes a dispenser housing having a first chamber and a second chamber, the first chamber including a discharger rod and an activation button in communication with the discharger rod, the second chamber including a retractable holder, a resilient device, and a wall having a slot defined therethrough, the resilient device contacting a surface of the retractable holder.

4. The system for dispensing oral consumables as recited in claim 1, wherein oral consumables are configured as pills.

5. The system for dispensing oral consumables as recited in claim 1, wherein oral consumables are configured as films.

6. A dispenser for dispensing oral consumables, comprising:
   a retractable holder for receiving and storing oral consumables; and
   a toggle guide assembly including a fixed base, a circuit channel defined within the base, a frame slidably mounted to the base, a toggle rod pivotally connected to the frame and extending between the channel and the frame, and a resilient device connected to the frame and the base,
   wherein the retractable holder is affixed to the slidable frame.

7. A system for dispensing oral consumables, comprising the dispenser recited in claim 6 and a mobile device.

8. The dispenser for dispensing oral consumables as recited in claim 6, further comprising:
   a mill including a plurality of spaced arms;
   a first pulley connected to the plurality of arms;
   a motor;
   a second pulley connected to the motor; and
   a belt connected to the first pulley and the second pulley.

9. A system for dispensing oral consumables, comprising the dispenser recited in claim 8 and a mobile device.

* * * * *